J. HARMATTA.
ELECTRIC WELDING.
APPLICATION FILED DEC. 3, 1903.
1,046,066.
Patented Dec. 3, 1912.
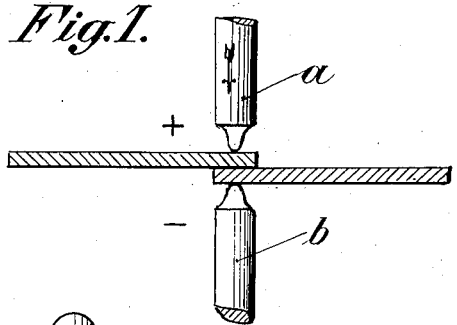
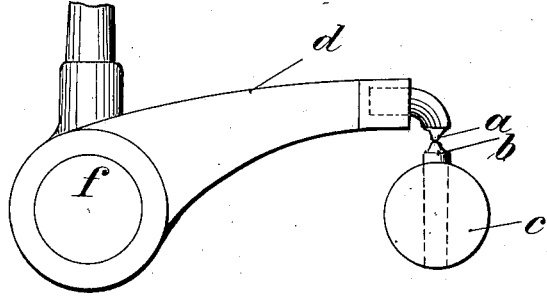
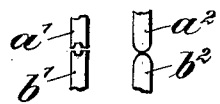
Witnesses:
Inventor:
Johann Harmatta

UNITED STATES PATENT OFFICE.

JOHANN HARMATTA, OF SZEPESVÁRALJA, AUSTRIA-HUNGARY, ASSIGNOR TO THOMSON ELECTRIC WELDING COMPANY, OF LYNN, MASSACHUSETTS, A CORPORATION OF MASSACHUSETTS.

ELECTRIC WELDING.

1,046,066.  Specification of Letters Patent.  Patented Dec. 3, 1912.

Application filed December 3, 1903. Serial No. 183,677.

*To all whom it may concern:*

Be it known that I, JOHANN HARMATTA, engineer, a subject of the King of Hungary, residing at Szepesváralja, in the Empire of Austria-Hungary, have invented new and useful Improvements in Electric Welding, of which the following is a specification.

My invention relates to the manufacture of metal articles of all kinds and consists in a novel method of fastening the component parts together by the process of electric welding and also in the new article produced thereby.

The invention affords a cheap and practical substitute for riveting and is particularly useful in fastening plates or sheets of metal to one another inasmuch as it may be employed for the thinner sheet metal, such for instance as is used for sheet metal ware like vessels or household utensils.

In general terms the invention may be stated to consist in fastening the pieces together by an electric weld at one or more distinct or well-defined spots, each of small area or extent, in their juxtaposed or opposite plane faces by the application of pressure and heating current localized in such spots, and in the special method of localizing the heating and the pressure in the spot or spots as hereinafter described and specified more particularly in the claims.

It has been before proposed to electrically weld two rods of metal together by a butt-welding process, the area of union effected being substantially coextensive with the cross-section of the pieces at their meeting ends, that is to say, the weld has been made over substantially the whole area of the opposed portions of said pieces. It has also been proposed to make a lap joint between the ends of two strips of metal by electrically uniting them together over substantially the whole area of the lapping surfaces.

A weld formed according to my invention is distinguished however from such prior welds, among other things, by the fact that the opposed surfaces available for uniting the pieces together and in which it might be possible to form a weld are welded in a small spot or spots only, the spot or spots being surrounded by comparatively large areas of opposed surfaces in which no weld is made.

By the term "electric welding" as used herein I mean that wellknown process in which the work is brought to the welding temperature by internal heat generated by the resistance of the work itself to the passage of an electric current at the place of contact between the parts to be joined by the welding pressure, and I disclaim those processes of fastening pieces of metal together in which the parts are heated and practically melted down by an electric arc generated on the back of the piece by "drawing" an arc by means of the electrode, as well as other processes in which the welding heat is generated externally and electrically in a resistance material and is imparted to the work by heat conduction from said resistance material in contact with the work.

While it is possible, consistently with my invention, to localize the desired pressure and heating current at the desired distinct small spot or area in various ways, this may be accomplished conveniently by pressure applied over the spot and itself localized on the back of the plate or sheet immediately over the small spot in which the union is to be made by using a tool pressed against the work by its end and formed at such end so as to engage the work by a spot or area of small extent and serving, likewise, by preference, as the electrode which feeds the current into the work to heat the same. The member which feeds the electricity being thus at the same time the tool, in this manner the most favorable conditions of working possible are secured, since, as is well known, in really effective welding processes the place of welding brought to the proper temperature must be at once well hammered or pressed in order that the welding may be thorough.

For carrying out the new process various apparatus may be employed, as the necessary pressure may be exerted at the place of welding by the aid of any of those technical means which are suitable for producing or transmitting pressure, e. g., with a press either direct or by means of indirect transmission by levers. Or it may be by means of simple hand levers, that is to say, by means of direct or indirect manual power, or by other means.

In the accompanying drawings, Figure 1 illustrates the application of my invention to the welding of two plates or sheets overlapped so as to be superposed or have a portion only of their meeting faces presented to one another and by the welding of the opposed surfaces intermittently or at certain spots only through applying pressure at a point or spot on the back of a plate over the spot of desired union. Fig. 2 is a side elevation of a welding device, also illustrated in part in Fig. 1. It shows the construction of the means which may be employed for pressing the electrode against the work by manual power. Figs. 3 and 4 show forms which may be adopted for the ends of the electrodes where they engage the work.

Electrodes a, b are by preference both formed to engage the work by a small area of contact and may each be adapted to work on the smallest possible surface contact, so as to localize the pressure and the path of the heating current in a very small spot only. The lower electrode b may be inserted in a conductor c and forms one pole of the heating current, while the upper electrode is carried by an arm d, which can be turned on a shaft f by means of a hand lever e, and is connected with the opposite pole of the circuit feeding current to the work. By this means the electrode a may be caused to approach and recede from the electrode b and to exert pressure upon the back of the two superposed sheet-metal pieces introduced between the electrodes for the purpose of welding. The two superposed metal plates to be welded together being in position between the electrodes as indicated in Fig. 1, the operation is performed by firmly pressing the electrode a down upon the work with any required degree of pressure by means of the lever e and the circuit is closed by any suitable means, thus producing a flow of heating current through the work itself substantially localized therein so as to bring the same to the necessary welding temperature at the desired spot only, and the application of pressure by the use of the lever e will result in the welding of the plates together in the small sharply defined place of welding at the point or spot desired, which perfectly answers the purpose of a rivet. In this event, especially in the case of thin vessels which are not required to withstand great pressure, the pressure on the place of welding may at the right moment be exactly regulated or kept within the proper limits. Obviously, the operation may be repeated upon the work at another point if it is desired to join the pieces at a number of spots only.

The time or duration of pressure and heating and the amount of pressure as well as the volume of current for effecting the weld can be readily determined by experiment for different sizes or thicknesses of metal and as well understood in the art of electric welding to which my invention relates.

The operation is completed with the cutting off of the flow of current in the usual manner practiced in the art of electric welding and the withdrawal of pressure when desired to permit the work to be withdrawn from position between the electrodes.

Sheet metal work made by this process is readily distinguished from that made by prior processes by the comparative absence of burning, roughening or disintegration of the material on the back of the plate when the operation is carefully conducted. It further possesses the advantage that there are no rivet heads to mar the finish of the back or outer surfaces of the plate.

I am aware that it has been before proposed to fasten two sheets of metal together by electrically welding them over practically the whole area of their opposed or lapping surfaces. I am also aware of patent to H. F. A. Kleinschmidt No. 616,436, dated December 20th, 1898, and do not wish to be understood as claiming anything disclosed in said patent.

What I claim as my invention is:—

1. The hereinbefore described improved method of fastening two pieces of metal together by electrically welding them to one another at spots only of their juxtaposed or opposite faces by the application of pressure and heating current localized in such spots.

2. The herein described method of uniting two pieces of metal at a number of distinct or separate spots separated from one another by well-defined areas of no union, consisting in applying pressure localized at the spots of desired union, and passing electric current through the pieces from one to the other while confining the flow of current to said spots until the union is effected.

3. The herein described method of uniting two pieces of metal, consisting in pressing them together while passing a heating electric current from one to the other and localizing the flow of current and the heating throughout the operation in a spot or spots of circumscribed or limited area as compared with the area of the immediately opposed surfaces so as to limit the union of the pieces to a spot or spots.

4. The improved method of uniting two pieces of metal at a spot or spots only in their opposed meeting surfaces, consisting in pressing the two pieces together, and passing a welding electric current from one to the other while localizing the pressure in and confining the flow of current to the spot or spots of desired union so as to produce an isolated spot or spots of union, leaving distinct or well-defined areas in which the pieces are not welded together.

5. The method of uniting two sheet metal pieces together face to face, consisting in pressing them together, and, simultaneously with the pressure, passing an electric current from one to the other at isolated or distinct spots in the areas lapping or opposed, said spots being separated from one another by such a distance that there is a union of the sheets at spots entirely surrounded by areas of no union.

6. The method of uniting sheets of metal by pressing them together and at the same time passing a heating and welding current from one to the other at a spot on their meeting surfaces which is restricted in area throughout the operation so as to leave on the meeting surfaces a well-defined and comparatively extensive area of no union completely surrounding said spot.

7. The process of electrically welding thin metallic sheets, which consists in introducing the sheet metal parts to be welded between electrodes, pressing said electrodes firmly together and closing the circuit, whereby a small, sharply defined place of welding which answers the purpose of a rivet is obtained, substantially as set forth.

8. The method of electrically welding two plates or sheets of metal together face to face between electrodes, consisting in restricting the area of contact of an electrode with said plates to a spot, passing a heating electric current from said electrode to the coöperating electrode through said spot to heat the work to welding temperature and applying pressure to the work in line with said spot to effect a welding of one plate to the other.

9. The herein described method of producing a welding temperature in a small distinct spot or point of the opposed surfaces of two plates of metal, consisting in applying pressure at a point or spot only at the back of a plate coinciding with the desired point or spot of welding, while the plates are assembled face to face, to localize the flow of current in the required point or spot in the meeting surfaces and passing an electric current through the plates in the line of the applied pressure to bring the material to welding temperature at the spot of welding by the resistance of the work to the passage of such current.

10. The method of electrically welding a piece of sheet metal at a small distinct spot or point in its plane surface to the face of another piece of metal, consisting in applying pressure at a small point or spot on the back of the sheet to localize the pressure and electrical heating of the work at a spot of electrical contact in the opposed surfaces of said pieces beneath the point of applied pressure, and passing an electric current from one to the other at the said spot of localized electrical contact to produce a welding temperature at said spot and maintaining the localized pressure to effect a welding at said spot.

11. The herein described method of welding two pieces of sheet metal together by a weld at a small spot only of their opposed surfaces, consisting in applying pressure localized in a spot on the back of a sheet directly over the desired spot of union, while said sheet is assembled face to face with the opposite sheet and so as to localize the pressure and electrical heating in a spot in the meeting surfaces of the sheets, and effecting the weld by passing an electrical current from one sheet to the other through said spot in the line of the localized applied pressure, and by pressure applied in said line.

12. The method of electrically welding two pieces of sheet metal to one another, consisting in pressing the sheets together by pressure applied and localized in a distinct well-defined point or spot on the rear surface of a sheet while passing an electric current through them in the line of the pressure, thereby localizing the path of the heating current from one to the other of the meeting surfaces of the sheets to cause the said sheets to be heated to welding temperature by the electric resistance of the work at said spot, and applying pressure localized over said spot whereby the pieces are welded together at a distinct well defined spot in their meeting surfaces answering the purpose of a rivet.

13. The method of electrically welding two plates of metal together face to face, consisting in pressing the plates together between two electrodes one of which at least makes contact with the rear of a plate at a spot only, feeding a heating electric current into the plates by said electrodes to bring the plates to welding temperature by the heating effect due to the electrical resistance of the portion of the circuit containing said plates, and effecting an electric welding of one plate to the other at a spot beneath the electrode by the pressure of said electrode.

14. The herein described method of fastening two sheets of metal together at a distinct point or spot only in their plane meeting surfaces, consisting in pressing the sheets together and localizing the contact pressure of each upon the other at the said pressure of each upon the other at the said distinct spot or point, passing an electric current from one sheet to the other through said localized spot of contact pressure between them to bring the metal to welding temperature in said spot and thereupon completing the weld in the material so brought to welding temperature and uniting the pieces by a welded union at said spot only.

15. The herein described method of fastening two pieces or sheets of metal together at a spot only in their meeting surfaces, consisting in pressing them together at said spot, passing an electric current through said pieces or sheets at said spot to raise the same to welding temperature and applying welding pressure localized in the back of a sheet immediately over said spot to effect the weld.

16. The herein described method of welding two pieces of sheet metal together by pressing them together between electrodes engaging the surface of the sheets at a spot only and bringing the section of work between them to the welding temperature by its resistance to the passage of an electric current fed through the work by said electrodes.

17. Metal plates fastened together by a number of distinct or isolated welds on their meeting surfaces and in spots comprising meeting portions of the metal plates, the backs of said plates being practically unaltered in their metallic condition and the spots on the meeting surfaces being separated from one another by distinct unwelded areas.

18. Sheet metal work comprising pieces of sheet meal welded together in the material of their meeting surfaces and in spots only, each surrounded by distinct areas of unwelded union, the back surfaces of said pieces being substantially unaltered over the welded spots, substantially as and for the purpose described.

19. Composite metal work having its component pieces welded together in spots only involving the material of their opposed or meeting surfaces, said spots being each entirely surrounded by distinct areas of unwelded union and the portion of the pieces back of the welds being substantially unaltered, as and for the purpose described.

20. Metal work comprising a metal plate fastened on its surface to the opposed surface of another piece of metal by a weld at a spot only in the material of the opposed surfaces, said spot being surrounded by a distinct area of unwelded union and the back surface of said plate being practically unaltered over said spot, as and for the purpose described.

21. A metal article comprising two bodies of metal having adjacent plane surfaces united at a plurality of spaced and isolated spots of integral and autogenous welded union, the metal at the spots of welded union having substantially the same qualities as at other points.

In witness whereof I havé hereunto signed my name this 5th day of November, 1903, in the presence of two subscribing witnesses.

JOHANN HARMATTA.

Witnesses:
CARL BECKER,
T. LA GUARDIA.